United States Patent

[11] 3,598,959

[72] Inventor Masao Ando
 Yokohamashi, Japan
[21] Appl. No. 61,694
[22] Filed Aug. 6, 1970
[45] Patented Aug. 10, 1971
[73] Assignee Chisso Corporation
 Osaka, Japan
[32] Priority Aug. 19, 1969, Nov. 8, 1969
[33] Japan
[31] 44/65488 and 44/89438

[54] METHOD FOR PARTIALLY INCREASING HEAT TO BE GENERATED IN A HEAT-GENERATING PIPE UTILIZING SKIN EFFECT CURRENT
 8 Claims, 10 Drawing Figs.
[52] U.S. Cl. .................................................. 219/300
[51] Int. Cl. .................................................. H05b 3/00
[50] Field of Search .................................................. 219/300

[56] References Cited
 UNITED STATES PATENTS
 3,524,966 8/1970 Ando .................................................. 219/300

Primary Examiner—R. F. Staubly
Attorney—Fred C. Philpitt

ABSTRACT: In a heat-generating pipe composed of a ferromagnetic pipe or pipes and an insulated wire passing therethrough, and having such a circuit that alternating current flowing through said ferromagnetic pipe flows concentratedly only on the inner skin portion of the ferromagnetic pipe, the ferromagnetic pipe is cut and divided into two portions, within a section where increase of heat to be generated is required, and the two points on the outer surfaces of the divided ferromagnetic pipes at both the ends of the section are connected by a conductor, whereby, within the section, AC flows also on the outer skin portion of the ferromagnetic pipes, and the amount of heat to be generated within the section is increased.

Further, within the section, a ferromagnetic ring or rings are strung on the ferromagnetic pipe(s), whereby an induction current flows on the ring(s) correspondingly to the AC flowing through the outer skin portions of the ferromagnetic pipe(s), and the amount of heat to be generated within the section can be further increased.

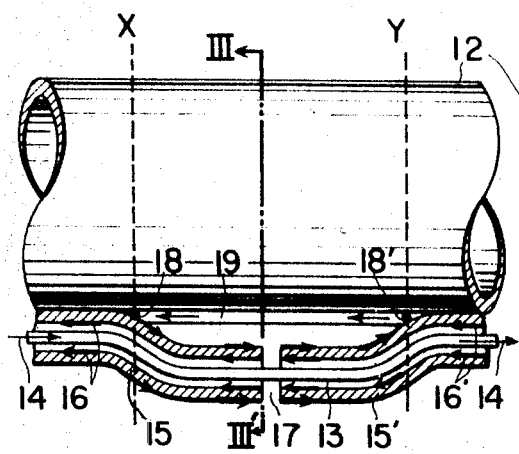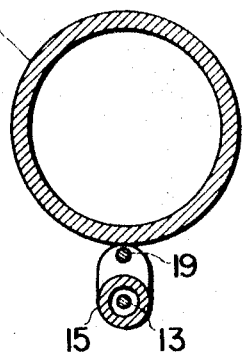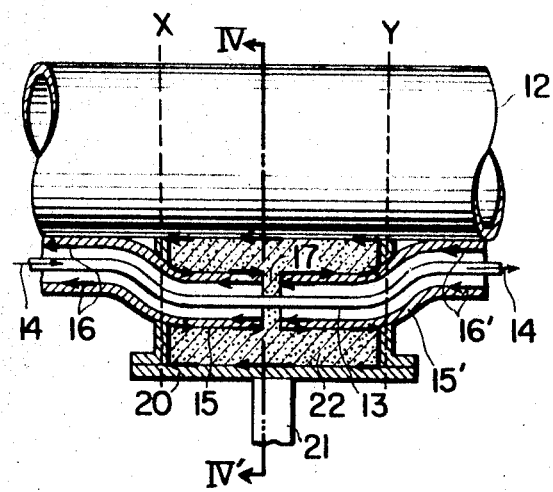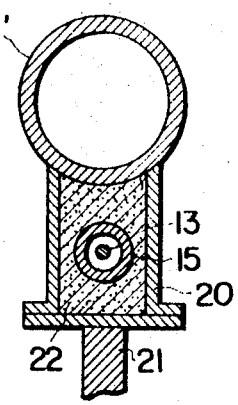

FIG. 5a
FIG. 5b
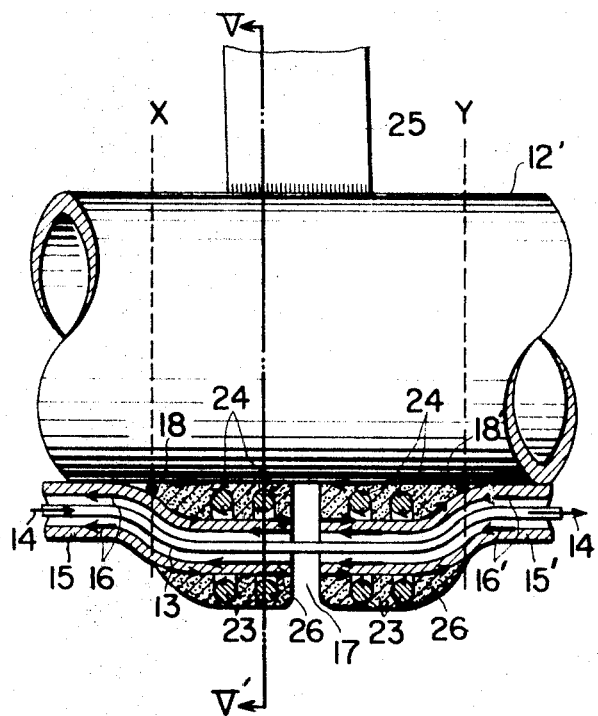
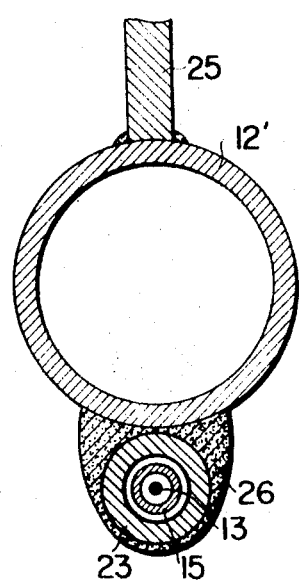

METHOD FOR PARTIALLY INCREASING HEAT TO BE GENERATED IN A HEAT-GENERATING PIPE UTILIZING SKIN EFFECT CURRENT

DESCRIPTION OF THE INVENTION

The present invention relates to a method for partially increasing the amount of heat to be generated, of a heat-generating pipe utilizing skin effect current.

The heat-generating pipe utilizing skin effect current referred to herein is a heat-generating pipe composed of a ferromagnetic pipe or pipes and an insulated wire passing therethrough, and having such a circuit that A.C. can flow concentratedly only on the inner skin portion of the ferromagnetic pipe.

Some of the examples are such an apparatus as that described in the specification of Japanese Pat. No. 460,224 (Patent Publication No. 12,128/1965) entitled "Method for transporting viscous liquid or liquid needing temperature maintenance, and transporting pipe equipment thereof," (corresponding to U.S. Pat. No. 3,293,407), or in the specification of Japanese Pat. application No. 20,427/1966 entitled "Heat-generating pipe apparatus utilizing skin effect current" (corresponding to U.S. Pat. No. 3,515,837).

FIGS. 1a and 1b of the accompanying drawings illustrate the principle of the heat-generating pipe described in the specification of said Japanese Pat. No. 460,224 (U.S. Pat. No. 3,293,407).

In these FIGS, numeral 1 shows a ferromagnetic pipe such as a steel pipe, and numeral 2 shows an insulated wire passing through the inside of the ferromagnetic pipe, one end of which is connected to one terminal of an AC power source 3 and the other end of which is connected to one end 5 of the ferromagnetic pipe 1 remote from the power source. The other end 4 of the ferromagnetic pipe 1 nearer to the power source, is connected to the other terminal of the power source 3 by a wire, whereby alternating currents 6 and 6' flow as shown by arrows, and alternating current 6' flowing through the ferromagnetic pipe 1 is concentrated only in the inner surface skin portion.

FIGS. 2a and 2b illustrate the principle of the heat-generating pipe described in the specification of said Japanese Pat. application No. 20,427/1966 (U.S. Pat. No. 3,515,837). In this Figure, numerals 7 and 7' show two ferromagnetic pipes such as a steel pipe, both the ends thereof being mutually connected together by conductors 8 and 8'. Numeral 9 shows an insulated wire passing through the inside of the ferromagnetic pipes, both the ends thereof being connected to an AC source 10. In this case, induction currents 11 and 11' flow through the ferromagnetic pipes 7 and 7' and conductors 8 and 8', and alternating current 11 flowing through the ferromagnetic pipes 7 and 7' is concentrated only in the inner surface skin portion thereof.

In these heat-generating pipes, the region where the alternating current flows on the surface portion of the ferromagnetic pipe is called the skin depth of alternating current.

The skin depth of alternating current, S (cm.) is given by the following formula, $$S = 5030 \sqrt{\frac{\rho}{\mu f}} \quad (1)$$

wherein $\rho$ ... Resistivity of a ferromagnetic pipe ($\Omega$ cm.)

$\mu$ ... Permeability of the same $f$ ... Frequency of the alternating current (Hz.).

If the above-mentioned ferromagnetic pipe has a thickness of $t$ (cm.), a length of $l$ (cm.) and an inner diameter of $d$ (cm.), and among them, there is a relationship of $$t > 2s, d >> s, l >> d \quad (2),$$

alternating currents 6' and 11 flow concentratedly only on the inner skin portion of the ferromagnetic pipe, and almost no voltage appears on the outer surface. Accordingly, even if the outer surface of the ferromagnetic pipe is short circuited by a wire having a low impedance, almost no current leaks outs, and safety is maintained even in contact with any object to be heated, and hence such apparatus can be utilized as a safe heat-generating pipe. Thus such a heat-generating pipe can be utilized as an economical means for heating or temperature maintenance of a transporting pipe of a fluid, surfaces of roads, floors or walls of buildings, etc.

In the utilization of the heat-generating pipe, there is often encountered a case where a partial increase of heat to be given to an object such as the above-mentioned transporting pipe, is required. For example, when said transporting pipe is supported by stanchions, heat escapes through the stanchions, and the temperature on these parts of the transporting pipe is more reduced than on other parts thereof. Thus, in case of transporting a viscous liquid, there sometimes occurs such a disadvantage as plugging in these parts. While, in case of a condensable gas, there is a fear of such a disadvantage that condensation occurs in these parts.

An object of the present invention is to provide a method for partially increasing the amount of heat to be generated in a heat-generating pipe utilizing skin effect current, in order to overcome such drawbacks. Such an object has been found to be attained by the present invention.

The present invention resorts, in the above-mentioned heat-generating pipe utilizing skin effect current, to such a method that the ferromagnetic pipe is cut and divided into two portions, within a section where increase of heat to be generated is required, and the two points on the outer surfaces of the divided ferromagnetic pipes at both the ends of the section are connected by a conductor, whereby, within the section, AC flows also on the outer skin portion of the ferromagnetic pipe, and the amount of heat to be generated within the section is increased.

The present invention will be further illustrated referring to the accompanying drawings.

FIGS. 1a, 1b, 2a and 2b illustrate the principles of publicly known heat-generating pipes utilizing skin effect current, as already mentioned above, and FIGS. 1a and 2a show a cross-sectional view in the longitudinal direction, while FIGS. 1b and 2b show a lateral cross-sectional view along lines I-I' and II-II' in FIGS. 1a and 2a, respectively.

FIGS. 3a and 3b illustrate the principle of the present invention, and FIG. 3a shows a cross-sectional view in the longitudinal direction, while FIG. 3b shows a cross-sectional view along line III-III' in FIG. 3a.

FIGS. 4a and 4b illustrate an embodiment of the present invention, and FIG. 4a shows a cross-sectional view in the longitudinal direction, while FIG. 4b shows a cross-sectional view along line IV-IV' in FIG. 4a.

FIGS. 5a and 5b illustrate another embodiment of the present invention, and FIG. 5a shows a cross-sectional view in the longitudinal direction, while FIG. 5b shows a cross-sectional view along line V-V' in FIG. 5a.

Figure 1A:
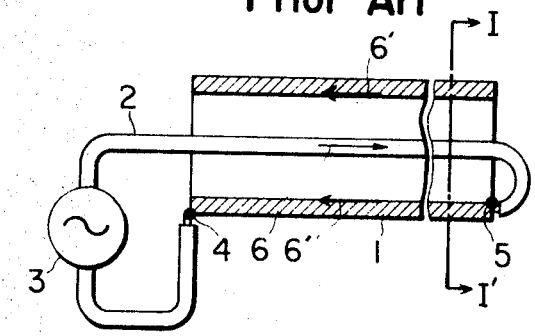

In FIGS. 3a and 3b, numeral 12 shows a transporting pipe of fluid, and an increase of heat within a section between X and Y is contemplated. In these Figures, an insulated wire 13 corresponds to the wire 2 of FIGS. 1a and 1b or the wire 9 of FIGS. 2a and 2b. Alternating current 14 flows through this wire 13, and currents 16 and 16' corresponding respectively to AC 6' of FIG. 1a and AC 11 of FIG. 2a flow.

Figure 1B:
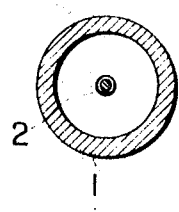
Figure 2A:
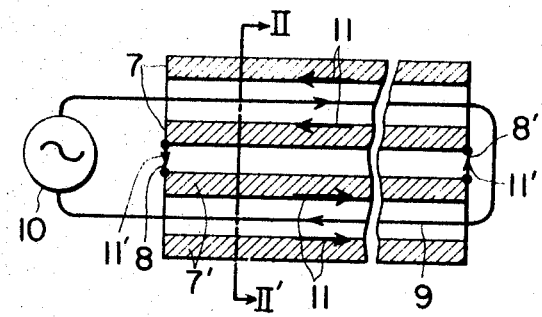
Figure 2B:
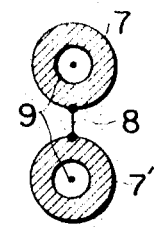

Now, the pipes 15 and 15' are not continuous and hence different from the ferromagnetic pipes 1 of FIGS. 1a, 1b and 7, 7' of FIGS. 2a, 2b. Namely, they are cut and divided into two portions at the part 17 of FIG. 3a, and the points 18 and 18' on the outer surface of said ferromagnetic pipes at both the ends of the section between X and Y are connected by a conductor 19. When the transporting pipe 12 is made of steel, its outer surface portion can function as a conductor by welding it to pipes 15 and 15' at both points 18 and 18'. Due to such dividing, the current flowing through the pipes 15 and 15', flows through both the inner and outer surfaces of the pipes 15 and 15' within the section between X and Y to form a circuit, as shown in this Figure. Namely, the current 16' flowing concentratedly through the inner skin portion of the pipe 15', passes from the inner skin portion to the outer skin portion at the cut end of the pipe, further passes through a connecting point 18', a conductor 19 and a connecting point 18 to the pipe 15, flows through the outer skin portion of this pipe 15, passes from the outer skin portion to the inner skin portion at the cut end thereof, and flows therethrough as an inner skin current 16.

Thus, in each part of the ferromagnetic pipes between X and Y, an equal amount of current flows on both the inner and outer surfaces, and since the heat generation of the heat-generating pipe utilizing skin effect current is generally caused mainly by the current flowing through the ferromagnetic pipe, it will be understood that an increase in the amount of heat to be generated results between X and Y.

In order to improve the conduction of the increased heat, a substance which has an electrically inferior but thermally good conductivity, can be filled in the clearance part between the ferromagnetic pipes 15, 15' and the object to be heated 12. As such a substance, a heat-conductive cement composed mainly of graphite can be illustrated.

FIG. 4 illustrates another embodiment of the present invention. Numeral 12' shows a transporting pipe of steel, numerals 13, 14, 16 and 17 are of the same as in FIG. 3, and numerals 15 and 15' show steel pipes. An external box 20 made of plate of ferromagnetic material such as steel is welded to the steel pipes 15, 15' and the transporting pipe 12'. Numeral 21 shows a stanchion. As shown in this Figure, the current 16' passes from the inner skin portion to the outer one of the steel pipe 15' at the cut end of the pipe, flows through the skin portions of the transporting pipe 12' and the external box 20, then flows through the outer skin portion of the steel pipe 15, passes to the inner skin portion at the cut end of the pipe 15, and flow therethrough as an inner skin current 16. In this apparatus, if the external box 20 and the transporting pipe 12' have each a sufficient thickness, i.e. a thickness more than twice the depth of the skin effect current, practically no current appears on their outer surfaces, and thus safety is maintained. Also, the external box 20 protects the part of the wire 13 exposed at the gap 17 from any abrasion coming from the outside. In the apparatus of FIGS. 4a and 4b, the amount of heat to be generated between X and Y is slightly less than twice those of other parts. The amount will be explained as follows:

The resistance per cm. run of the inner skin portions of the ferromagnetic (steel) pipes 15, 15' inside of the external box 20, $R_1$ ($\Omega$/cm.), is expressed using the equation (1) as follows:

$$R_1 \doteqdot \frac{\rho}{\pi ds} = \frac{\sqrt{\rho \mu f}}{5030 \pi d} \qquad (3)$$

while the resistance $R_2$ ($\Omega$/cm.) per cm. run of the outer skin portions is expressed as follows:

$$R_2 \doteqdot \frac{\sqrt{\rho \mu f}}{5030 \pi D} \qquad (4)$$

wherein $D$ (cm.) is the outer diameter.
Since
$$D = d + 2t \qquad (5),$$
$$R_1 > R_2 \qquad (6)$$
results, and therefore the resistance per cm. run of the skin portions including both the outer and inner ones of the steel pipes 15, 15' between X and Y, $R$ ($\Omega$/cm.), has the following relation:
$$R = R_1 + R_2 > 2R_1 \quad (7).$$

The amount of heat to be generated is generally in proportion to the circuit, hence the amount of heat to be generated between X and Y is slightly less than twice that of the other part.

In order that the equations (3)—(7) are perfectly held, one of the conditions among the relations, (2), i.e., $t > 2s$, must become such an extent that the condition
$$t > 4s \qquad (8)$$
is also held.

Since the steel pipes 15, 15' are usually welded to the transporting pipe 12' in order to make the heat conduction easy, the temperature difference between the steel pipes and the transporting pipe is very small. However, since the parts between X and Y, of the steel pipes 15, 15' are welded to the external box 20 only at their piercing parts, and they cannot be welded to other parts of the box nor to the transporting pipe 12', the temperatures of these parts under such a situation may rise above the allowable range. In such a case, a heat-conductive cement 22 composed mainly of graphite as mentioned above which has an electrically inferior but thermally good conductivity, is filled within the box. Thus, an abnormal rise of temperature in these parts, i.e. the section between X and Y, of the steel pipes 15, 15' can be avoided.

FIG. 5 illustrates concretely a method for further increasing the amount of heat to be generated, within the section between X and Y, wherein ferromagnetic rings are strung on the ferromagnetic pipes within the section between X and Y, as shown in FIG. 3.

In this FIG. 5, numeral 12' shows a transporting pipe of steel, and numerals 13, 14, 16 and 17 are of the same meaning as in FIG. 3. Steel pipes 15, 15' are welded to said transporting pipe 12', at each point 18 and 18' on their outer surfaces located at both the ends of the section between X and Y. Numeral 23 shows ferromagnetic rings such as steel ones. Numeral 25 shows a stanchion welded to the transporting pipe of steel, through which heat escapes. An eddy current 24 is induced on the above-mentioned rings 23, by the current flowing through the outer skin portion of the ferromagnetic pipes onto which rings are strung and by the current flowing through a conductor connecting the outer surface points 18 and 18' at both the ends of the section between X and Y of the above-mentioned ferromagnetic pipes (in this FIG. 5, the section between X and Y, of the transporting steel pipe corresponds to the conductor 19 in FIG. 3), whereby heat generation occurs in the rings 23. The thickness T of the section of the rings is preferred to be $T > 2s$. If the rings are made of steel and the current flowing through the ferromagnetic pipes has a commercial frequency, 3 mm. or more of the above-mentioned thickness T may be sufficient. The number of the rings can be increased according to the required increase of heat to be generated. As to the cross-sectional shape of the rings, a circular one is illustrated in FIG. 5, but any one of rectangular, trapezoidal ones, etc. can be selected. The heat generated on these rings is preferably conducted to the transporting pipe 12' through a cement 26 which has an electrically inferior but thermally good conductivity. The reason why the cement 26 should have an electrically inferior conductivity is that an electrical short circuit among the transporting pipe 12', ferromagnetic pipes 15, 15' and the rings 23 must be prevented. In the usual constructions, since the potential difference among them is within the range of several volts, even such a heat-conductive cement as composed mainly of graphite can be sufficiently used. If a box composed of a ferromagnetic material as shown in FIG. 4, is provided in such a way as to accommodate the above mentioned steel pipes 15, 15' and rings 23, safety is maintained without any current leaking outward, and the part of the wire 13 exposed in the gap 17 can be protected from abrasion coming from the outside.

What I claim is:
1. In a heat-generating pipe utilizing skin effect current, composed of a ferromagnetic pipe or pipes and an insulated wire passing through the inside thereof, and having such a circuit that when an alternating current is passed through the insulated wire, a current flowing through said ferromagnetic pipe(s) correspondingly to the alternating current flowing through the insulated wire, flows concentratedly only on the inner skin portion of said ferromagnetic pipe(s), a method for partially increasing the amount of heat to be generated in said heat-generating pipe utilizing skin effect current which comprises cutting and dividing said ferromagnetic pipe into two portions, within a section where increase of heat to be generated is desired, and connecting the two points (18 and 18') on the outer surfaces of the divided pipe portions at both the ends of the section by an electrical conductor, whereby, within the section, the current flows through not only the inner skin portions but also the outer skin portions of the pipe portions within the section.

2. A method according to claim 1, wherein a substance which has an electrically inferior but thermally good conductivity, is filled in the clearance space between the ferromagnetic pipe portions and an object to be heated, within said section to improve the heat conductivity therebetween.

3. A method according to claim 2, wherein said substance which has an electrically inferior but thermally good conductivity is a heat-conductive cement composed mainly of graphite.

4. A method according to claim 1, wherein the electrical conductor connecting the two points (18, 18') is a box composed of a plate or plates of ferromagnetic material having each a thickness more than twice the depth of the skin effect current and containing therein the ferromagnetic pipe portions within the section.

5. A method according to claim 1, wherein one or more rings of a ferromagnetic material are strung on the ferromagnetic pipe portions within said section.

6. A method according to claim 5, wherein a substance which has an electrically inferior but thermally good conductivity, is filled in the clearance space among said ferromagnetic pipe portions, said rings and the object to be heated, within said section to improve the heat conductivity among them.

7. A method according to claim 6, wherein said substance which has an electrically inferior but thermally good conductivity is a heat-conductive cement composed mainly of graphite.

8. A method according to claim 5, wherein the electrical conductor connecting the two points (18, 18') on the outer surfaces of the divided pipe portions at both ends of the section, is a box composed of a plate or plates of a ferromagnetic material having a thickness more than twice the depth of the skin effect current and accommodating therein the ferromagnetic pipe portions and the rings within the section.